(12) United States Patent
Tsai

(10) Patent No.: US 8,031,413 B2
(45) Date of Patent: Oct. 4, 2011

(54) SINGLE FOCUS WIDE-ANGLE LENS MODULE

(75) Inventor: Fei-Hsin Tsai, Wai Pu Hsiang (TW)

(73) Assignee: Newmax Technology Co., Ltd, Taichung County ( * ) Notice: Subject to any disclaimer, the term of this patent is extended or adjusted under 35 U.S.C. 154(b) by 63 days.

(21) Appl. No.: 12/636,621

(22) Filed: Dec. 11, 2009

(65) Prior Publication Data

US 2011/0128615 A1 Jun. 2, 2011

(30) Foreign Application Priority Data

Nov. 27, 2009 (TW) ............................... 98140548 A

(51) Int. Cl.
*G02B 9/34* (2006.01)
*G02B 13/18* (2006.01)

(52) U.S. Cl. ...................................... 359/771; 359/715

(58) Field of Classification Search .................. 359/715, 359/771, 772, 779, 781
See application file for complete search history.

(56) References Cited

U.S. PATENT DOCUMENTS 7,911,715 B2 * 3/2011 Shinohara .................... 359/779
* cited by examiner

*Primary Examiner* — David N Spector

(57) ABSTRACT

A single focus wide-angle lens module includes a fixed aperture diaphragm, a first lens, a second lens, a third lens and a fourth lens arranged from an object side to an image side in a sequence of: the first lens, the diaphragm, the second lens, the third lens and the fourth lens. The first lens has a concave surface on the image side and at least one aspheric surface. The second lens has a positive refractive power, a concave surface on the object side and at least one aspheric surface. The third lens has a meniscus shape, a negative refractive power, a concave surface on the object side and at least one aspheric surface. The fourth lens has a positive refractive power, a convex surface on the object side and at least one aspheric surface.

9 Claims, 8 Drawing Sheets

Non-point aberration and distorted aberration

Spherical surface aberration

Focal Length : f = 6 mm
(F NO.) : F 2.4
Viewing angle : 2ω= 70°

$\frac{|f_2|}{|f_3|} = 0.544$ $\quad \frac{|f_3|}{|f_4|} = 1.777$ $\quad \frac{|f_{234}|}{|f|} = 0.854$ $\quad \frac{|f|}{|TL|} = 0.4$

| Surf | Radius | Thickness | nd | vd |
|---|---|---|---|---|
| OBJ | Infinity | Infinity | | |
| 1 | 3.81682 | 1.510823 | 1.607000 | 27.000000 |
| 2 | 3.529446 | 0.3777598 | | |
| STO | Infinity | 0.2220757 | | |
| 4 | -4.817677 | 2.503865 | 1.535000 | 56.000000 |
| 5 | -2.480601 | 1.850148 | | |
| 6 | -1.873777 | 2.369163 | 1.535000 | 56.000000 |
| 7 | -3.704485 | 0.1975283 | | |
| 8 | 2.55372 | 2.501141 | 1.535000 | 56.000000 |
| 9 | 5.001732 | 0.8 | | |
| 10 | Infinity | 0.7 | 1.516798 | 64.198266 |
| 11 | Infinity | 0.9765561 | | |
| 12 | Infinity | 0.55 | 1.516798 | 64.198266 |
| 13 | Infinity | 0.39 | | |
| IMA | Infinity | | | |

FIG.1B

Focal Length : f = 6 mm
(F NO.) : F 2.4
Viewing angle : 2ω= 70°

$\frac{|f_2|}{|f_3|} = 0.544$ $\quad$ $\frac{|f_3|}{|f_4|} = 1.777$ $\quad$ $\frac{|f_{234}|}{|f|} = 0.854$ $\quad$ $\frac{|f|}{|TL|} = 0.4$

SURFACE DATA DETAIL:

| Surface 1 | | Surface 2 | |
|---|---|---|---|
| K : | -0.4323714 | K : | 5.585681 |
| A : | 0.007885081 | A : | 0.00963072 |
| B : | -0.000596707 | B : | -0.024681155 |
| C : | 0.000450315 | C : | 0.015250556 |
| D : | -0.000047097 | D : | -0.010098596 |
| Surface 4 | | Surface 5 | |
| K : | 11.16114 | K : | 0.09361525 |
| A : | 0.021641361 | A : | 0.009701563 |
| B : | -0.031934049 | B : | -0.000699648 |
| C : | 0.021949216 | C : | 0.00015 |
| D : | -0.009602326 | D : | -0.000012295 |
| Surface 6 | | Surface 7 | |
| K : | -3.442483 | K : | -5.739436 |
| A : | 0.007870178 | A : | -0.016299337 |
| B : | -0.001355606 | B : | 0.001721827 |
| C : | 0.00004239 | C : | -0.000131884 |
| D : | 0.000002646 | D : | 0.000004219 |
| Surface 8 | | Surface 9 | |
| K : | -2.961313 | K : | -0.003168039 |
| A : | -0.000335613 | A : | -0.007314884 |
| B : | -0.000102838 | B : | 0.000134392 |
| C : | 0.000003822 | C : | -0.000001046 |
| D : | 0.000000012 | D : | -0.000000055 |

FIG.1C

Non-point aberration and distorted aberration

Spherical surface aberration

Focal Length : f = 5.96 mm
(F NO.) : F 2.4
Viewing angle : 2ω= 70°

$\frac{|f_2|}{|f_3|} = 0.605$  $\frac{|f_3|}{|f_4|} = 1.885$  $\frac{|f_{234}|}{|f|} = 0.8837$  $\frac{|f|}{|TL|} = 0.39$

| Surf | Radius | Thickness | nd | vd |
|---|---|---|---|---|
| OBJ | Infinity | Infinity | | |
| 1 | 3.702955 | 1.314242 | 1.535000 | 56.000000 |
| 2 | 2.480813 | 0.5848757 | | |
| STO | Infinity | 0.3153732 | | |
| 4 | -11.98608 | 2.15734 | 1.535000 | 56.000000 |
| 5 | -2.909426 | 2.579737 | | |
| 6 | -2.14147 | 1.461916 | 1.585000 | 30.000000 |
| 7 | -4.032462 | 0.6965156 | | |
| 8 | 2.355027 | 2.5 | 1.535000 | 56.000000 |
| 9 | 6.138018 | 0.8 | | |
| 10 | Infinity | 0.7 | 1.516798 | 64.198266 |
| 11 | Infinity | 0.95 | | |
| 12 | Infinity | 0.55 | 1.516798 | 64.198266 |
| 13 | Infinity | 0.39 | | |
| IMA | Infinity | | | |

FIG.2B

Focal Length : f = 5.96 mm
(F NO.) : F 2.4      $\frac{|f_2|}{|f_3|} = 0.605$    $\frac{|f_3|}{|f_4|} = 1.885$    $\frac{|f_{234}|}{|f|} = 0.8837$    $\frac{|f|}{|TL|} = 0.39$
Viewing angle : 2ω= 70°

SURFACE DATA DETAIL:

| Surface 1 | | Surface 2 | |
|---|---|---|---|
| K : | -0.9728513 | K : | 1.566752 |
| A : | 0.026735011 | A : | 0.073139529 |
| B : | -0.005855864 | B : | -0.061696958 |
| C : | 0.000966707 | C : | 0.024818782 |
| D : | -0.000069075 | D : | -0.005453739 |
| Surface 4 | | Surface 5 | |
| K : | -35.63232 | K : | -0.4389765 |
| A : | 0.048104327 | A : | 0.006710248 |
| B : | -0.039033019 | B : | -0.003025806 |
| C : | 0.011618558 | C : | 0.000307021 |
| D : | -0.001149219 | D : | -0.000056065 |
| Surface 6 | | Surface 7 | |
| K : | -4.820138 | K : | -6.083696 |
| A : | -0.011890304 | A : | -0.020343946 |
| B : | 0.001899587 | B : | 0.002189358 |
| C : | -0.000224428 | C : | -0.000173531 |
| D : | 0.000011739 | D : | 0.000006445 |
| Surface 8 | | Surface 9 | |
| K : | -3.149731 | K : | 0.5375662 |
| A : | -0.000142703 | A : | -0.004187008 |
| B : | -0.0001254 | B : | -0.000178131 |
| C : | 0.000001845 | C : | 0.000011782 |
| D : | 0.000000058 | D : | -0.000000287 |

FIG.2C

SINGLE FOCUS WIDE-ANGLE LENS MODULE

BACKGROUND OF THE INVENTION

1. Field of the Invention

The present invention relates to the field of optical lenses, and more particularly to a small-sized four-piece single focus lens module capable of capturing infrared rays.

2. Description of the Prior Art

As digital imaging technologies advances, present digital carriers such as digital cameras and mobile phones tend to be miniaturized. Thus the sensors such as CCD or CMOS are also miniaturized.

Infrared condensing lens modules are used not only in the photograph field, but also in the infrared capturing and detecting field in recent years. Thus they are requested to provide miniaturized structure with wider detecting angle.

Besides, the chief ray angle of the present wide-angle lens modules is too big, and thus cannot satisfy the product installation requirements that the chief ray angle should approach 0 degree.

Therefore, the present invention is arisen to obviate or at least mitigate the above mentioned disadvantages.

SUMMARY OF THE INVENTION

The main object of the present invention is to provide a single focus wide-angle lens module with better focusing and heat condensing performances.

Another object of the present invention is to provide a four-piece single focus wide-angle lens module with bigger detecting angle and optical properties.

Yet another object of the present invention is to provide a single focus wide-angle lens module whose chief ray angle approaches 0 degree.

To achieve the above and other objects, a single focus wide-angle lens module of the present invention includes a fixed aperture diaphragm, a first lens, a second lens, a third lens and a fourth lens, arranged from an object side to an image side in a sequence of: the first lens, the diaphragm, the second lens, the third lens and the fourth lens.

The first lens has a concave surface on the image side and at least one aspheric surface. The second lens has a positive refractive power, a concave surface on the object side and at least one aspheric surface. The third lens has a meniscus shape, a negative refractive power, a concave surface on the object side and at least one aspheric surface. The fourth lens has a positive refractive power, a convex surface on the object side and at least one aspheric surface.

Thereby, the detecting angle of the lens module is expected to increase, and the chief ray angle of the lens module is expected to approach 0 degree, thus meets the product installation requirements.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 1B is a schematic view showing the data of optical features and aspheric surface coefficients of an imaging lens module in accordance with a first preferred embodiment of the present invention;

FIG. 1C is another schematic view showing the data of optical features and aspheric surface coefficients of an imaging lens module in accordance with a first preferred embodiment of the present invention;

FIG. 2B is a schematic view showing the data of optical features and aspheric surface coefficients of an imaging lens module in accordance with a second preferred embodiment of the present invention.

FIG. 2C is another schematic view showing the data of optical features and aspheric surface coefficients of an imaging lens module in accordance with a second preferred embodiment of the present invention.

DETAILED DESCRIPTION OF THE PREFERRED EMBODIMENTS

Figure 1:
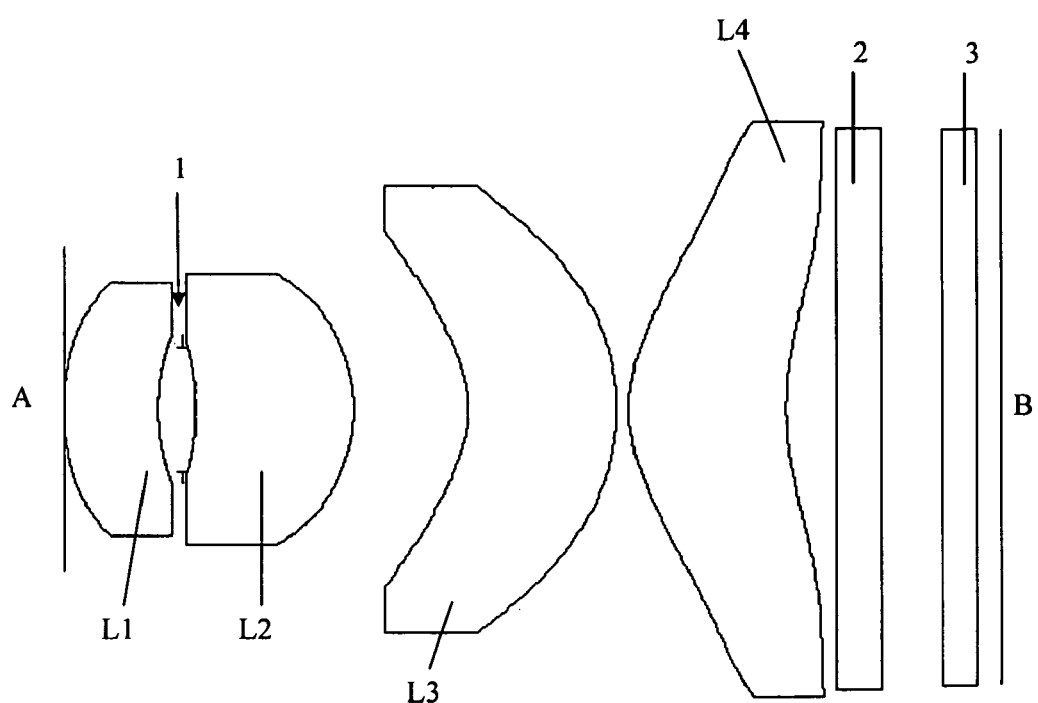
FIG. 1 is a schematic view showing an imaging lens module in accordance with a first preferred embodiment of the present invention.
Figure 2:
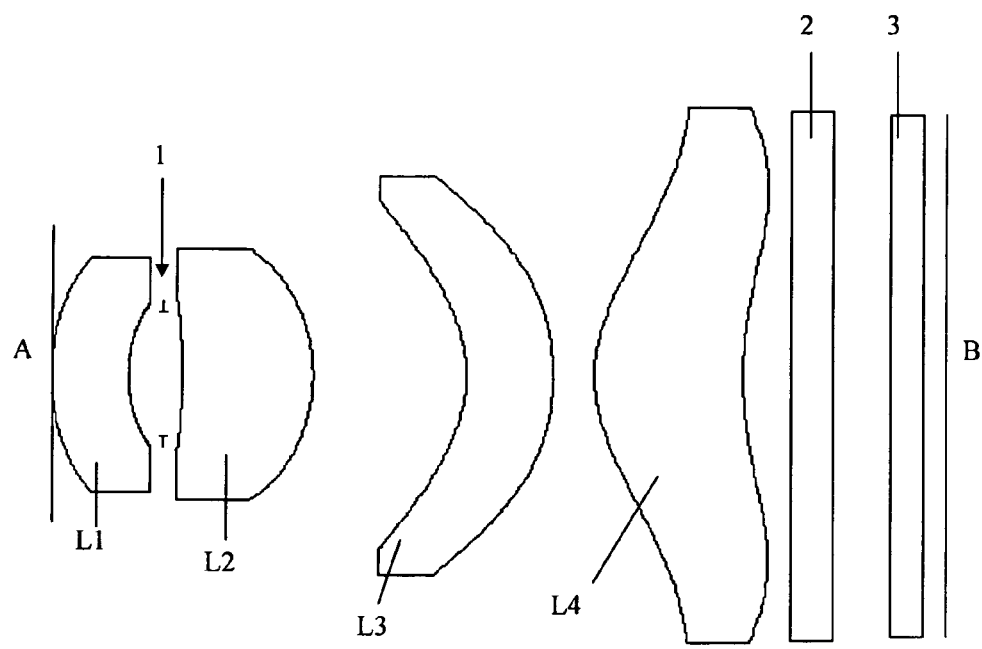
FIG. 2 is a schematic view showing an imaging lens module in accordance with a second preferred embodiment of the present invention.

FIG. 1 and FIG. 2 show schematic views of lens modules in accordance with the first and second preferred embodiments of the present invention respectively. Each lens module includes a fixed aperture diaphragm 1 and an optical module, which includes a first lens L1, a second lens L2, a third lens L3 and a fourth lens L4. The diaphragm 1 and the optical module are arranged from an object side A to an image side B is a sequence of: the first lens L1, the diaphragm 1, the second lens L2, the third lens L3 and the fourth lens L4.

The first lens L1 has a concave surface on the image side B and at least one aspheric surface. The second lens L2 has a positive refractive power, a concave surface on the object side A and at least one aspheric surface. The third lens L3 has a meniscus shape, a negative refractive power, a concave surface on the object side A and at least one aspheric surface. The fourth lens L4 has a positive refractive power, a convex surface on the object side A and at least one aspheric surface.

In the optical module composed of four lenses in accordance to the system of the invention, a first plane glass 2 is disposed behind the fourth lens L4. The first plane glass 2 is infrared transparent. In addition, a second plane glass 3 is installed before the image side B for providing an effect of protecting an infrared sensor and used for infrared sensors of different packages. Quantities of the first glass 2 and the second glass 3 may be changed arbitrarily for providing a better imaging quality. Also, the second glass 3 is infrared transparent. Further, the image side B refers to an infrared sensor.

Each lens is made by a plastic material or a glass material, especially the first to the fourth lenses may all be plastic lenses with aspheric surface(s). The plastic material allows the lens to be shown in the structure with an aspheric surface, and the lens is used as an aspheric lens for providing a higher resolving power and reducing the number of lenses required for the imaging process, so as to achieve a good detecting quality for the infrared sensor.

Figure 1A:
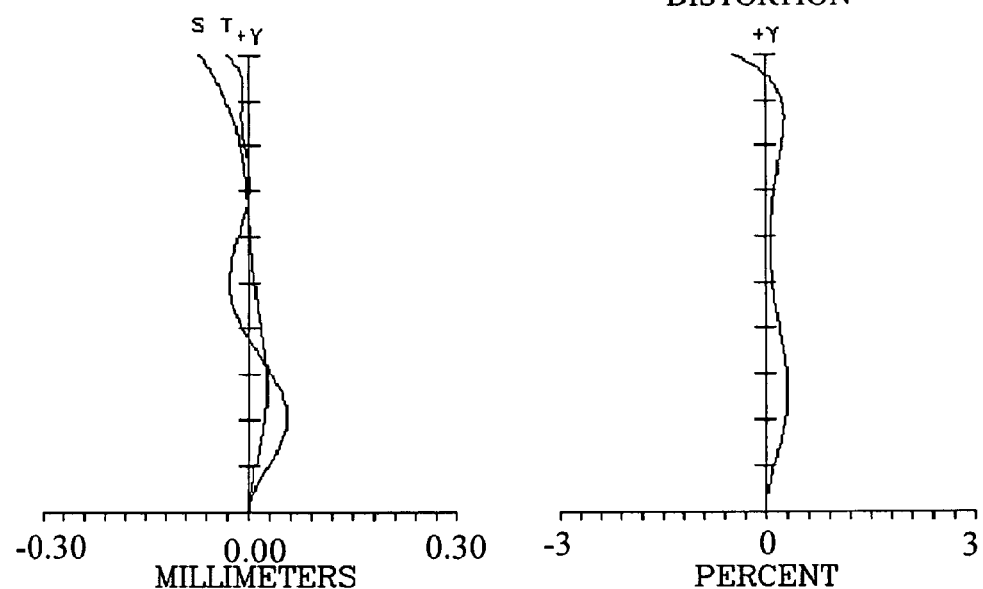
FIG. 1A is a schematic view showing the aberration of an imaging lens module in accordance with a first preferred embodiment of the present invention.
Figure 1A:
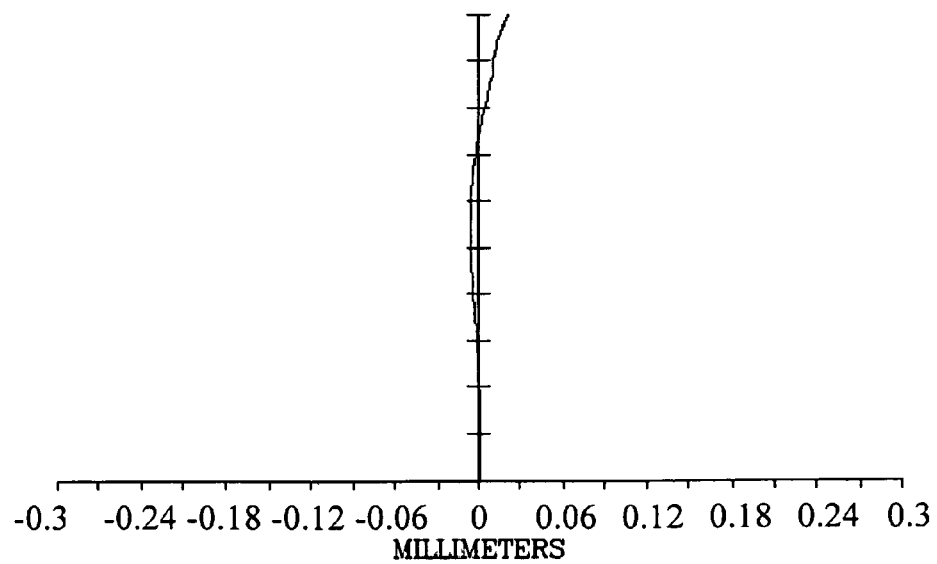
Figure 2A:
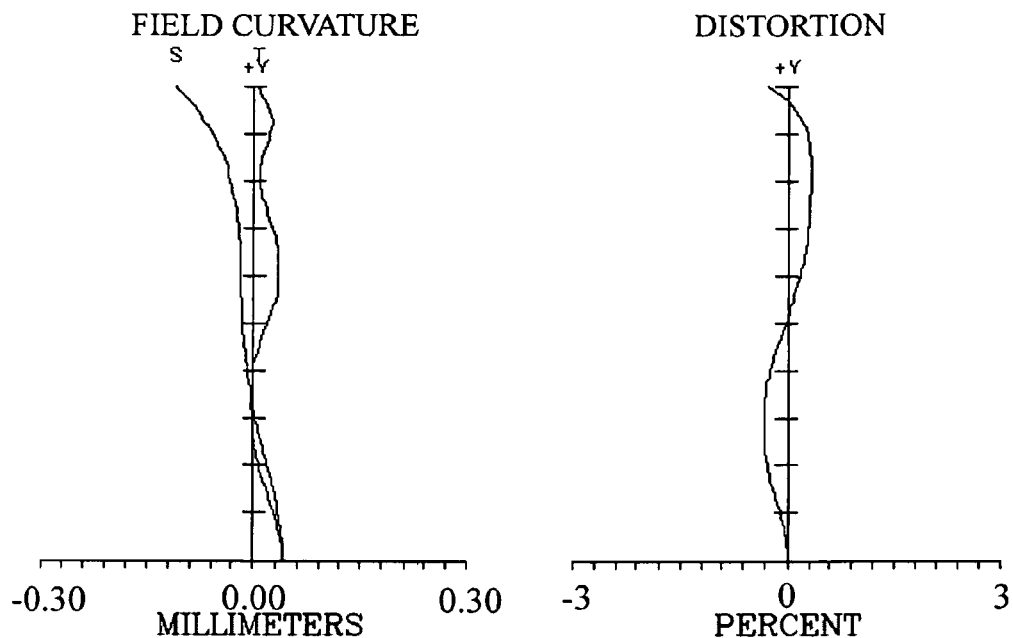
FIG. 2A is a schematic view showing the aberration of an imaging lens module in accordance with a second preferred embodiment of the present invention.
Figure 2A:
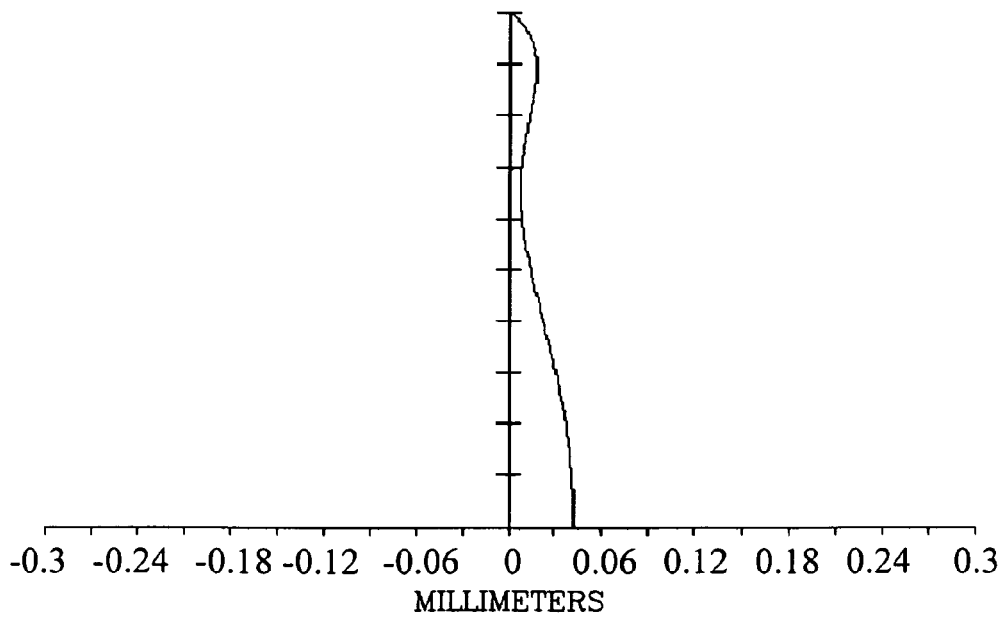

In addition, the schematic views of the aberration of the invention are non-point aberration, distorted aberration and spherical surface aberration as shown in FIG. 1A and FIG. 2A. Regardless of which aberration, the aberration relates to a data of a line d, and the non-point aberration relates to the data of an S image plane (SAGITTAL) which is related to the data of a T image plane (TANGENTIAL).

From the figures of the aberrations, the correction of the aberration of the invention is obtained completely from a simulated design, and thus there will be no problems in practical applications.

Refer to FIG. 1B, FIG. 1C, FIG. 2B, and FIG. 2C for the data of aspheric surfaces in accordance with the first and second preferred embodiments of the invention, the data displayed at the top are numerals representing each lens or element of the optical module of the invention.

The value of F. No. shows the parameter of brightness. The smaller the value of F is, the higher the brightness is.

Viewing angle: 2ω.

Focal Length f: f is the overall focal length (mm) of the optical module, and 1, 2, 3, 4, 5, 6, 7, 8, 9, 10, 11, 12, 13 listed below are numbers of lenses counting in a sequence starting from the object side; the surface numbers 1, 2 represent two surfaces of the first lens L1, the surface numbers 4, 5 represent two surfaces of the second lens L2, the surface numbers 6, 7 represent two surfaces of the third lens L3, the surface numbers 8, 9 represent two surfaces of the fourth lens L4, and 10, 11, 12, 13 represent two surfaces of the first plane glass 2 and the second plane glass 3 respectively.

In the present invention, the focal length value f2 of the second lens and the focal length value f3 of the third lens must satisfy the following relationship:

$$0.2<|f2|/|f3|<1$$

In the present invention, the focal length value f3 of the third lens and the focal length value f4 of the fourth lens must satisfy the following relationship:

$$1.2<|f3|/|f4|<2.2$$

In the present invention, the overall focal length value f234 of the second lens, the third lens and the fourth lens and the focal length value f of the whole lens module must satisfy the following relationship:

$$|f234|/|f|<2$$

Also, the focal length value f of the whole lens module and the distance TL between the first surface of the first lens and an imaging surface must satisfy the following relationship:

$$0.1<|f/TL|<0.7$$

If the above relationship is not satisfied, the performance, the resolving power and the yield rate of the lens module will be decrease.

Since every lens of the lens module has at least one aspheric surface, the shape of the aspheric surface must satisfy the condition of the following formula:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

Where, z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

In the single focus wide-angle lens module of the present invention, the coordination of the first and second lenses and the coordination of the third and fourth lenses enable the lens module to obtain wider viewing angle, i.e. the detecting angle which has reached at least 70 degrees and maintain the resolving power of the lens module as well.

In comparison to the conventional wide-angle lens module having larger chief ray angle, the present invention has successfully lowered the chief ray angle to approach 0 degree, so as to meet the product installation requirements.

What is claimed is:

1. A single focus wide-angle lens module, comprising a fixed aperture diaphragm, a first lens, a second lens, a third lens and a fourth lens, arranged from an object side to an image side in a sequence of:
    the first lens, having a concave surface on the image side and at least one aspheric surface;
    the fixed aperture diaphragm;
    the second lens, having a positive refractive power, a concave surface on the object side and at least one aspheric surface;
    the third lens, having a meniscus shape, a negative refractive power, a concave surface on the object side and at least one aspheric surface;
    the fourth lens, having a positive refractive power, a convex surface on the object side and at least one aspheric surface;
wherein $1.2<|f3|/|f4|<2.2$, and f3 is a focal length value of the third lens, f4 is a focal length value of the fourth lens.

2. A single focus wide-angle lens module, comprising a fixed aperture diaphragm a first lens, a second lens a third lens and a fourth lens, arranged from an object side to an image side in a sequence of:
    the first lens, having a concave surface on the image side and at least one aspheric surface;
    the fixed aperture diaphragm;
    the second lens, having a positive refractive power, a concave surface on the object side and at least one aspheric surface;
    the third lens, having a meniscus shape a negative refractive power, a concave surface on the object side and at least one aspheric surface;
    the fourth lens, having a positive refractive power, a convex surface on the object side and at least one aspheric surface;
wherein $|f234|/|f|<2$, and f234 is an overall focal length value of the second lens, the third lens and the fourth lens, f is a focal length value of the whole lens module.

3. A single focus wide-angle lens module,
    comprising a fixed aperture diaphragm, a first lens, a second lens, a third lens and a fourth lens, arranged from an object side to an image side in a sequence of:
    the first lens, having a concave surface on the image side and at least one aspheric surface;
    the fixed aperture diaphragm;
    the second lens, having a positive refractive power, a concave surface on the object side and at least one aspheric surface;
    the third lens, having a meniscus shape, a negative refractive power, a concave surface on the object side and at least one aspheric surface;
    the fourth lens, having a positive refractive power, a convex surface on the object side and at least one aspheric surface;
wherein $0.2<|f2|/|f3|<1$, and f2 is a focal length value of the second lens, f3 is a focal length value of the third lens.

4. The lens module of claim 3, wherein $0.1<|f/TL|<0.7$, and f is a focal length value of the whole lens module, TL is the distance between a first surface of the first lens and an imaging surface.

5. The lens module of claim 3, wherein each of the aspheric surfaces is in a shape satisfying a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

and z is a value of a reference position with respect to a vertex of the surface along the optical axis and at a position with a height h; k is a conic constant; c is the reciprocal of a radius of curvature; and A, B, C, D, E, G . . . are coefficients of high level aspheric surfaces.

6. The lens module of claim 3, wherein 1.2<|f3|/|f4|<2.2, and f3 is a focal length value of the third lens, f4 is a focal length value of the fourth lens.

7. The lens module of claim 6, wherein |f234|/|f|<2, and f234 is an overall focal length value of the second lens, the third lens and the fourth lens, f is a focal length value of the whole lens module.

8. The lens module of claim 7, wherein 0.1<|f/TL|<0.7, and f is a focal length value of the whole lens module, TL is the distance between a first surface of the first lens and an imaging surface.

9. The lens module of claim 8, wherein each of the aspheric surfaces is in a shape satisfying a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

and z is a value of a reference position with respect to a vertex of the surface along the optical axis and at a position with a height h; k is a conic constant; c is the reciprocal of a radius of curvature; and A, B, C, D, E, G . . . are coefficients of high level aspheric surfaces.

* * * * *